US010726056B2

(12) United States Patent
Liu

(10) Patent No.: US 10,726,056 B2
(45) Date of Patent: Jul. 28, 2020

(54) SPEECH-BASED DATABASE ACCESS

(71) Applicant: SAP SE, Walldorf (DE)

(72) Inventor: Shuping Liu, Shanghai (CN)

(73) Assignee: SAP SE, Walldorf (DE)

( * ) Notice: Subject to any disclaimer, the term of this patent is extended or adjusted under 35 U.S.C. 154(b) by 222 days.

(21) Appl. No.: 15/484,012

(22) Filed: Apr. 10, 2017

(65) Prior Publication Data

US 2018/0293300 A1  Oct. 11, 2018

(51) Int. Cl.
| | | |
|---|---|---|
| *G06F 7/02* | (2006.01) | |
| *G06F 16/00* | (2019.01) | |
| *G06F 16/332* | (2019.01) | |
| *G06F 16/33* | (2019.01) | |
| *G06F 16/901* | (2019.01) | |
| *G10L 15/26* | (2006.01) | |
| *G06F 40/279* | (2020.01) | |
| *G06F 40/289* | (2020.01) | |

(52) U.S. Cl.
CPC ...... *G06F 16/3329* (2019.01); *G06F 16/3344* (2019.01); *G06F 16/9017* (2019.01); *G06F 40/279* (2020.01); *G06F 40/289* (2020.01); *G10L 15/26* (2013.01)

(58) Field of Classification Search
CPC ......... G10L 15/22; G10L 15/26; G10L 15/02; G10L 15/1815; G10L 15/28; G10L 17/22; G06F 3/167; G06F 16/9535; G06F 17/2785; G06F 16/60; G06F 16/248; G06F 16/73; G06F 16/61; G06F 16/3329; G06F 16/63; G06F 16/632
See application file for complete search history.

(56) References Cited

U.S. PATENT DOCUMENTS

| | | | | |
|---|---|---|---|---|
| 10,083,697 | B2 * | 9/2018 | Sung | H04L 67/42 |
| 2012/0233207 | A1 * | 9/2012 | Mohajer | G10L 15/063 |
| | | | | 707/769 |
| 2013/0006629 | A1 * | 1/2013 | Honda | G10L 15/187 |
| | | | | 704/236 |
| 2013/0132079 | A1 * | 5/2013 | Sehgal | G10L 15/22 |
| | | | | 704/235 |

(Continued)

OTHER PUBLICATIONS

Nareshkumar, S., et al., "Database Interaction Using Automatic Speech Recognition," International Journal of Innovative Research in Science, Engineering and Technology, *ICIET'14*, pp. 1895-1899, Mar. 21-22, 2014.

*Primary Examiner* — Bruce M Moser
(74) *Attorney, Agent, or Firm* — Mintz Levin Cohn Ferris Glovsky and Popeo, P.C.

(57) ABSTRACT

In one respect, there is provided a method that includes converting, into text, audio that includes a speech-based query. A first portion, a second portion, and a third portion of the text can be identified based on a semantic rule. The first portion of the text can be an operation specified by the speech-based query. The second portion of the text can be an object specified by the speech-based query. The third portion of the text can be a parameter specified by the speech-based query. A database query can be formed to include the operation being performed with respect to the object and in accordance with the parameter. Furthermore, the database query can be executed at a database. Related systems and articles of manufacture, including computer program products, are also disclosed.

14 Claims, 6 Drawing Sheets

(56) References Cited

U.S. PATENT DOCUMENTS

| | | | |
|---|---|---|---|
| 2014/0278343 A1* | 9/2014 | Tran | G06F 17/2785 704/2 |
| 2015/0220511 A1* | 8/2015 | Yang | G06F 16/3344 704/9 |
| 2016/0203002 A1* | 7/2016 | Kannan | G06F 3/167 715/708 |
| 2017/0199867 A1* | 7/2017 | Koji | G06F 17/271 |
| 2017/0206797 A1* | 7/2017 | Solomon | G09B 7/08 |
| 2017/0220677 A1* | 8/2017 | Kazi | G06F 16/35 |
| 2017/0256260 A1* | 9/2017 | Jeong | G06F 3/16 |

* cited by examiner

SPEECH-BASED DATABASE ACCESS

FIELD

The present disclosure generally relates to database processing and, more specifically, to an automatic speech recognition based technique for accessing a database.

BACKGROUND

Databases typically store and manage data in a structured manner. For instance, a relational database organizes data based on a relational model in which data sharing one or more of the same attributes may be grouped into tables. Typically, data held in a relational database may be accessed using structured query language (SQL) queries that retrieve data based on specific criteria.

SUMMARY

Methods, systems, and articles of manufacture, including computer program products, are provided for speech-based database access. In some implementations of the current subject matter, there is provided a computer-implemented method. The method may include: converting, into text, audio comprising a speech-based query; identifying, based at least on a semantic rule, a first portion of the text, the first portion of the text comprising an operation specified by the speech-based query; identifying, based at least on the semantic rule, a second portion of the text, the second portion of the text comprising an object specified by the speech-based query; identifying, based at least on the semantic rule, a third portion of the text, the third portion of the text comprising a parameter specified by the speech-based query; forming a database query that comprises the operation being performed with respect to the object and in accordance with the parameter; and executing, at a database, the database query.

In some variations, one or more of the features disclosed herein including the following features can optionally be included in any feasible combination. The object may be a table at the database. The parameter may be an attribute of the object, the attribute being a column in the table corresponding to the object.

In some variations, the database query may be validated prior to executing the database query at the database. The validating of the database query may include determining whether the database includes the table that corresponds to the object specified by the speech-based query. The validating of the query may further include determining whether the table includes the column that corresponds to the parameter specified by the speech-based query.

In some variations, the semantic rule may specify at least one of a syntax and a diction of the speech-based query. The first portion of the text may be identified by at least matching the first portion of the text to the one or more verbs specified by the semantic rule. The second portion of the text may be identified by at least identifying a portion of the text that follows the first portion of the text. The third portion of the text may be identified by at least identifying a portion of the text that follows the second portion of the text.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
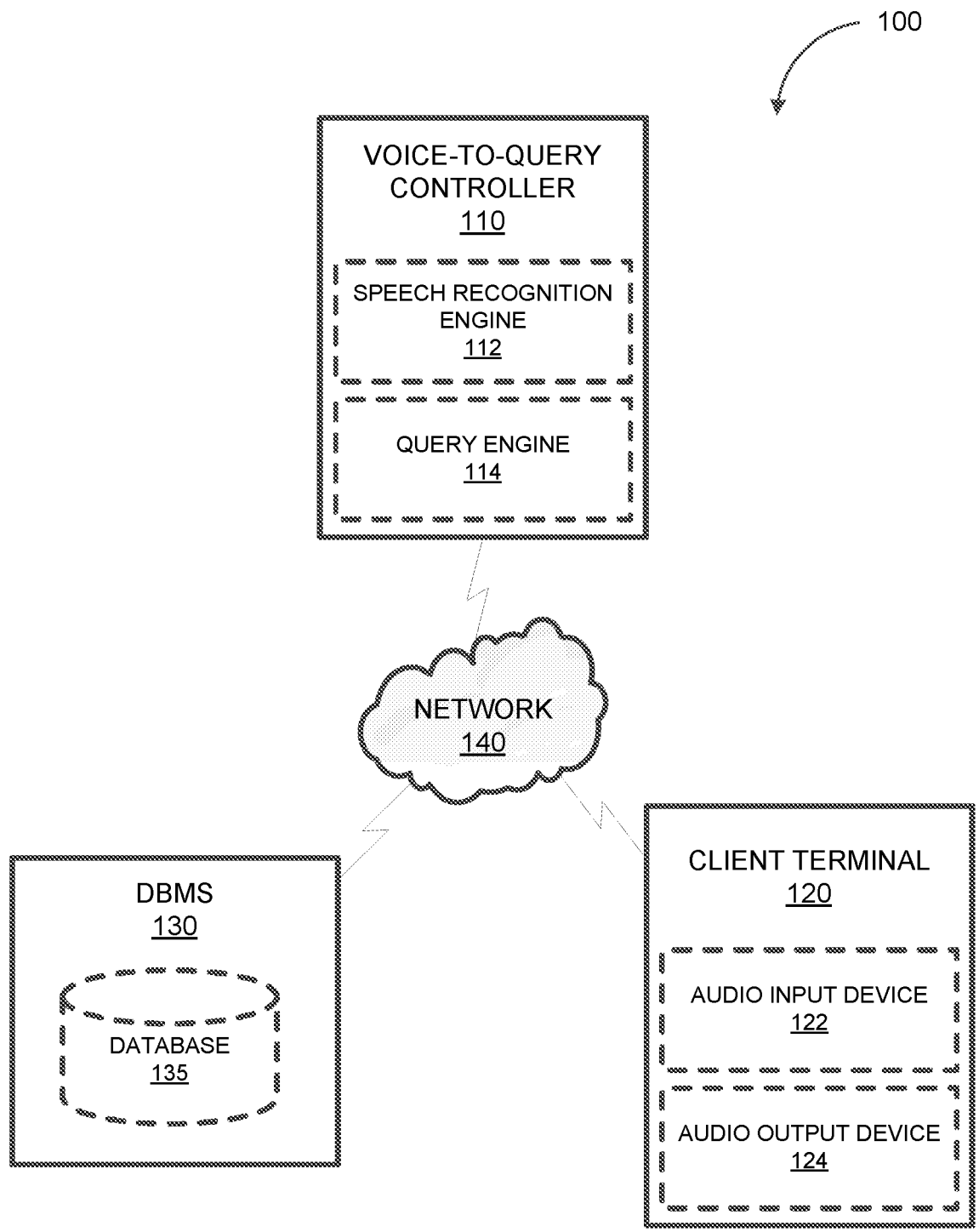
FIG. 1 depicts a system diagram illustrating a speech recognition system, in accordance with some example embodiments.

Like labels are used to refer to same or similar items in the drawings.

DETAILED DESCRIPTION

Data held in a database, such as a relational database, is typically accessed by a query, such as a SQL query, entered via a keyboard while the results of the query are subsequently delivered via a display. While automatic speech recognition technology does exist for natural language processing, these existing techniques do not take into account the structure of data stored in a database as well as the semantics of a database query. Thus, natural language based automatic speech recognition techniques may not be efficient for processing database queries that access data stored in a database.

In some example embodiments, a voice-to-query controller may receive a speech-based query via an audio input device, such as a microphone. The voice-to-query controller may be configured to translate the speech-based query into a query, such as a SQL query, that can be executed at a database, such as a relational database. Thus, the voice-to-query controller may convert into text the audio signal associated with a speech-based query. This generated text may be further parsed in accordance with query semantic rules that govern the diction and/or the syntax of the speech-based query. For instance, the text corresponding to a speech-based query may be parsed, based on the query semantic rules, to identify portions of the text that corresponds to the verb, the object, and the one or more parameters specified by the speech-based query. The voice-to-query controller can generate, based on the verb, the object, and the parameter specified by the speech-based query, a query that can be executed at the database. For instance, the query can be executed at the database by at least retrieving, based on the object and the parameter specified by the speech-based query, data from the database. The data retrieved from the database can be further converted into an audio signal that can be delivered via an audio output device, such as a speaker.

FIG. 1 depicts a system diagram illustrating a speech recognition system 100, in accordance with some example embodiments. Referring to FIG. 1, a voice-to-query controller 110 may be communicatively coupled with a client terminal 120 and a database management system (DBMS) 130 via a wired and/or wireless network 120. The client terminal 120 may be any device capable of wired and/or wireless communication including, for example, a computer, a tablet, a smartphone, and/or the like. The wired and/or wireless network 120 can be a wide area network (WAN), a local area network (LAN), and/or the Internet.

In some example embodiments, the client terminal 120 may include an audio input device 122 and/or an audio output device 124. The audio input device 122 may be any device capable of capturing, as input, an audio signal. For instance, the audio input device 122 may be a microphone and/or like. Meanwhile, the audio output device 124 may be any device capable of providing, as output, an audio signal. For example, the audio output device 124 may be a speaker and/or the like. According to some example embodiments, the audio input device 122 may capture an audio signal corresponding to a speech-based query while the audio output device 124 may provide an audio signal corresponding to a result of the speech-based query.

In some example embodiments, the DBMS 130 may be configured to manage one or more databases including, for example, a database 135. As used herein, a database may refer to electronically stored data that has been organized into a collection of objects such as, for example, database tables. The DBMS 130 may enable interactions with the objects (e.g., database tables) held in the database 135. For example, the DBMS 130 may support access to the objects held in the database 135 via one or more database queries.

The database 135 may be configured to store data that may be accessed via one or more queries. For example, the database 135 may be a relational database that may be accessed via one or more SQL queries. Speech-based queries for accessing the database 135 may be formulated in accordance with certain query semantic rules. It should be appreciated that these query semantic rules may restrict the diction and/or the syntax of a speech-based query. For example, a query semantic rule may require a speech-based query to specify an operation that corresponds to a specific verb such as, for example, "search," "find," "look up," "drill down," "sort," "filter," and/or the like. Another query semantic rule may require the operation to be followed by an object and one or more parameters. These parameters may indicate a specific value, a specific range, and/or any other restriction on the operation being performed on the object. Based on the semantic rules, a portion of a speech-based query that follows a verb may be the object of the query while another portion of the speech-based query that follows the object may be the parameters of the query.

It should be appreciated that one or more semantic rules may be predefined for a system such as the database 135. Semantic rules may be generated by a semantic model that is trained, via machine learning, to identify words in natural language input and the relationship between these words. In some implementations of the current subject matter, a semantic rule can be applied to identify the components of a speech-based query including, for example, one or more verbs, objects, and/or conditions. These components of the speech-based query may subsequently be mapped to a database-specific query such as, for example, a SQL statement. As such, the same semantic rules can be applied across databases that support different query languages including, for example, object-oriented Datalog (.QL), 4D Query Language (4D QL), BQL, Datalog, hypertext structure query language (HTSQL), IBM® Business System 12 (IBM BS12), information systems base language (ISBL), Java object oriented querying (jOOQ), Java persistence query language (JPQL), Language Integrated Query (LINQ), object query language (OQL), Quel, Tutorial D, extensible markup language (XML) query (XQuery), and/or the like.

As used herein, an object may be a data structure, such as a table, that is used by a database, such as the database 135, to store data. The data may be in the form of records that occupy individual rows in the table. Meanwhile, a parameter may be a criterion for retrieving at least some of the records from an object. To further illustrate, a sample speech-based query to access the database 135 may state the following: "Find sales orders from Customer A in Location B." The speech-based query may include the verb "find," which may correspond to a database operation such as a SQL SELECT statement. The speech-based query may further refer to a "sales order" object and parameters for a specific customer and location. Here, the database 135 may include a "sales order" object, which may be a table storing records that correspond individual sales orders. The sample query may ask to retrieve at least some of the records from the "sales order" object by imposing the parameters for a certain Customer A and a specific Location B.

In some example embodiments, the voice-to-query controller 110 may be configured to process an audio signal corresponding to a speech-based query. For instance, the voice-to-query controller 110 may receive an audio signal captured by the client terminal 120 (e.g., the audio input device 122). The voice-to-query controller 110 may convert this audio signal, which may correspond to a speech-based query, into a query that can be executed at a database. For example, the voice-to-query controller 110 may convert the audio signal into a query that can be executed at the database 135.

As shown in FIG. 1, the voice-to-query controller 110 may include a speech recognition engine 112 and a query engine 114. The speech recognition engine 112 may be configured to convert, into text, an audio signal corresponding to a speech-based query (e.g., received from the client terminal 120). Meanwhile, the query engine 114 may be configured to generate, based at least on the query semantic rules, a query that can be executed at the database 135. The voice-to-query controller 110 may receive a speech-based query that conforms to one or more query semantic rules, which restrict the diction and/or the syntax of the speech-based query. As such, the query engine 114 may apply one or more query semantic rules in order to identify portions of a speech-based query that corresponds to an operation, an object, and one or more parameters.

In some example embodiments, the query engine 114 may validate the query prior to executing the query at the database 135. For instance, the query engine 114 may validate the query by at least determining whether an object of the query exists at the database 135 and/or whether the database 135 supports the one or more parameters specified by the query. To further illustrate, the query engine 114 may validate the speech-based query "Find sales orders from Customer A in Location B." In order to validate this sample query, the query engine 114 may determine whether the object "sales orders" exists at the database 135. That is, the query engine 114 may determine whether the database 135 includes a data structure, such as a table, for "sales orders."

Furthermore, the query engine 114 may determine whether the database engine 135 supports the parameters for specific customers and/or locations. Here, the query engine 114 may determine whether customer and/or location are attributes of the records stored in the "sales order" data structure. For instance, customer and/or location may be attributes if the records in the "sales order" data structure have a customer column and/or a location column. It should be appreciated that a parameter, such as customer and/or location, may not be valid if a corresponding attribute is absent from the object.

In some example embodiments, the query engine 114 may communicate with the DBMS 130 via one or more application programming interfaces (APIs). For instance, the query engine 114 may execute a query at the database 135 by at least calling one or more APIs associated with the DBMS 130. Alternately and/or additionally, the results of executing the query at the database 135 may be returned to the query engine 114 via one or more application programming interfaces. According to some example embodiments, the query engine 114 may provide, to the speech recognition engine 112, the results of the query. The speech recognition engine 112 may convert the results of the query into an audio signal. This audio signal may be played at the client terminal 120, for example by the audio output device 124, to enable a speech-based delivery of the results of the speech-based query.

Figure 2:
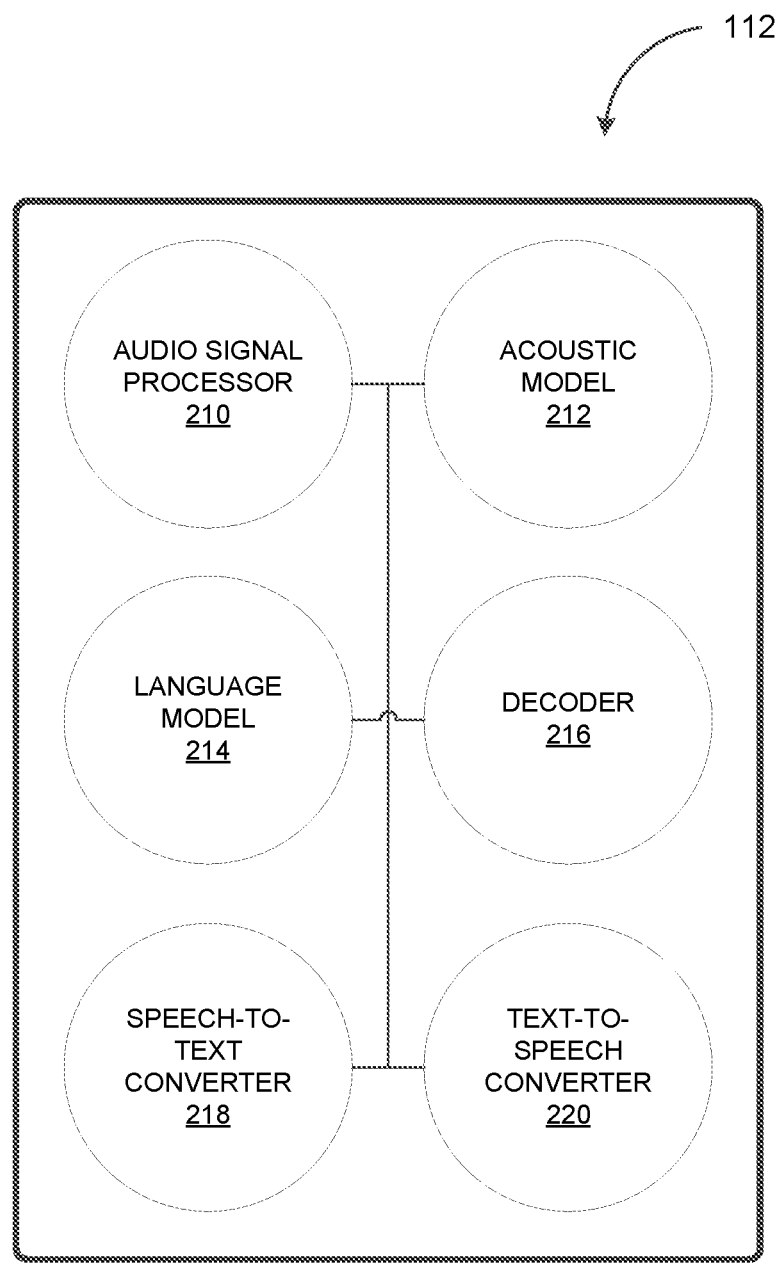
FIG. 2 depicts a block diagram illustrating a speech recognition engine, in accordance with some example embodiments.

FIG. 2 depicts a block diagram illustrating the speech recognition engine 112 in accordance with some example embodiments. Referring to FIGS. 1-2, the speech recognition engine 112 may include an audio signal processor 210, an acoustic model 212, a language model 214, a decoder 216, a speech-to-text converter 218, and a text-to-speech converter 220. It should be appreciated that the speech recognition engine 112 may include additional and/or different components than shown.

In some example embodiments, the audio signal processor 210 may be configured to process an audio signal (e.g., captured by the audio input device 122 at the client platform 120). As used herein, an audio signal may refer to an analog and/or digital representation of a soundwave. The audio signal processor 210 may process the audio signal by at least removing, from the audio signal, noise and/or channel distortions. Alternately and/or additionally, the audio signal processor 210 may process the audio signal by at least converting the audio signal from a time domain to a frequency domain. For instance, the conversion from a time domain to a frequency domain may be achieved by applying a Fourier transform to the audio signal, thereby decomposing the continuous time function describing the audio signal into the constituent frequencies of the audio signal.

According to some example embodiments, the audio signal processor 210 may be further configured to process an audio signal by extracting one or more features from the audio signal. For example, the audio signal processor 210 may extract, from the audio signal, one or more phonemes. As used herein, a phoneme may refer to a unit of speech that is capable of distinguishing one spoken word from another spoken word. For instance, the word "cat" may be distinguished from the word "bat" based on the phoneme corresponding to the letter "c" and the phoneme corresponding to the letter "b."

In some example embodiments, the acoustic model 212 may be configured to identify, based the features, such as phonemes, extracted by the audio signal processor 210 from the audio signal, one or more words that are likely to be present in the audio signal. Here, the acoustic model 212 may determine an acoustic model score for each word that may be present in the audio signal. The acoustic model score of a word may indicate a probability or likelihood that certain features extracted from the audio signal correspond to that word.

According to some example embodiments, the words that may correspond to the features extracted from the audio signal may be identified based on a plurality of established statistical representations (e.g., Hidden Markov Models, a recurrent neural network, and/or the like). For instance, the statistical representation of a word may be a particular sequence of features. To further illustrate, the statistical representation of the word "house" may be a sequence of phonemes that includes the phoneme "hh," the phoneme "aw," and the phoneme "s." As such, when the acoustic model 212 encounters the sequence of phonemes including the phoneme "hh," the phoneme "aw," and the phoneme "s," the acoustic model 212 may determine that the word "house" is likely to be present in the audio signal.

In some example embodiments, the language model 214 may be configured to identify word sequences (e.g., phrases, sentences) that are likely to be present in the audio signal. These word sequences may be formed from the words identified (e.g., by the acoustic model 212) as being likely to be present in the audio signal. Here, the language model 214 may determine a language model score for each word sequence that may be present in the audio signal. The language model score for a word sequence may indicate a probability or likelihood that this particular word sequence is present in the audio signal. In some example embodiments, the language model 214 may identify word sequences based on the statistical distribution of a known set of word sequences. Thus, the language model 214 may determine the probability or likelihood that particular word sequence is present in the audio signal based at least on a statistical prevalence of that word sequence in the known set of word sequences.

In some example embodiments, the decoder 216 may be configured to decode the audio signal based at least on the words that may be present in the audio signal and/or the word sequences that may be present in the audio signal. For instance, the decoder 216 may decode the audio signal based on the acoustic model scores of the words (e.g., determined by the acoustic model 212) that are likely to be present in the audio signal. Alternately and/or additionally, the decoder 216 may decode the audio signal based on the language model scores of the word sequences (e.g., determined by the language model 214) that are likely to be present in the audio signal. According to some example embodiments, the decoder 216 may determine, based at least on the acoustic model scores and/or the language model scores, the word sequence that corresponds to the audio signal. For example, the decoder 216 may determine that the audio signal corresponds to a word sequence having the highest acoustic model score and/or language model score.

In some example embodiments, the speech-to-text converter 218 may be configured to generate text that corresponds to a word sequence. For instance, the speech-to-text converter 218 may generate text for a word sequence that correspond to an audio signal (e.g., as determined by the decoder 216). According to some example embodiments, the query engine 114 may generate a query based on this text. For example, the query engine 114 may generate a SQL query that corresponds to the text, thereby converting the speech-based query embodied by the audio signal (e.g., captured by the audio input device 222 at the client terminal 220) into a query that may be executed at the database 135.

In some example embodiments, the text-to-speech converter 220 may be configured to generate an audio signal that corresponds to text. For instance, the text-to-speech converter 220 may generate an audio signal for text that conveys the results of querying the database 135. According to some example embodiments, the audio signal may be generated to enable a speech-based delivery of the results of a speech-based query that had been converted into a query (e.g., SQL query) that may be executed at the database 135.

Figure 3:
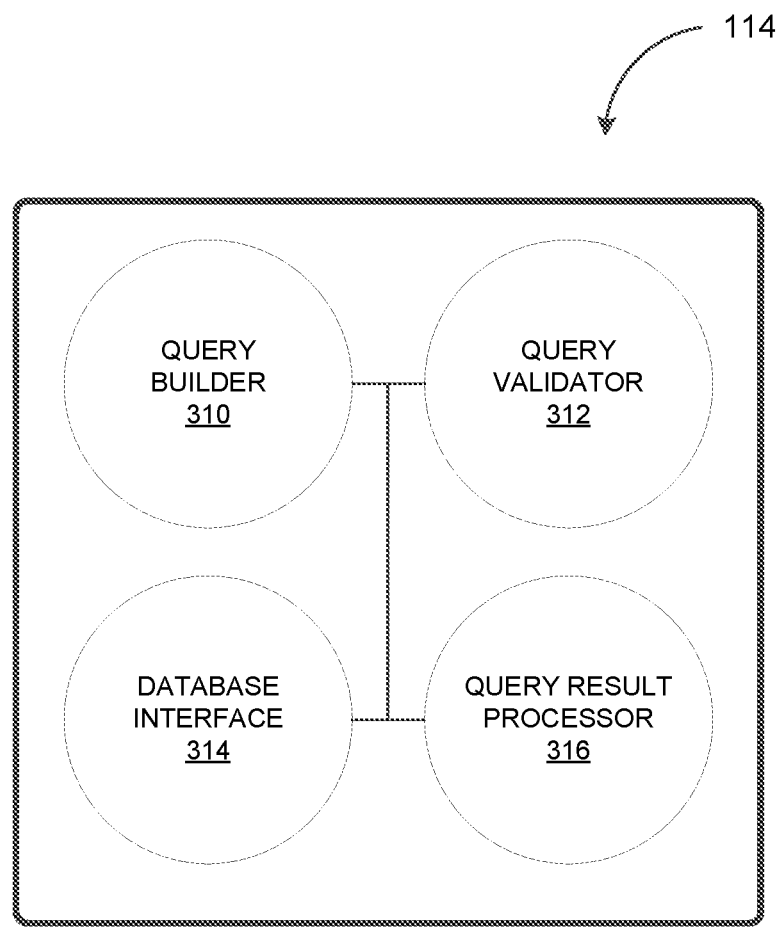
FIG. 3 depicts a block diagram illustrating a query builder, in accordance with some example embodiments.

FIG. 3 depicts a block diagram illustrating the query engine 114 in accordance with some example embodiments. Referring to FIGS. 1 and 3, the query engine 114 may include a query builder 310, a query validator 312, a database interface 314, and a query result processor 316. It should be appreciated that the query engine 114 may include additional and/or different components than shown.

In some example embodiments, the query builder 310 may be configured to generate a query based on the text corresponding to a speech-based query (e.g., as determined by the speech recognition engine 112). Here, the query builder 310 may generate the query by at least parsing, based at least on the query semantic rules, the text corresponding to the speech-based query. The diction and/or the syntax of the speech-based query may conform to one or more query semantic rules. For instance, in accordance to the query semantic rules, a speech-based query may include a verb that specifies an operation. In particular, the query semantic rules may require that the speech-based query include one or more specific verbs such as, for example, "search," "find," "look up," and/or the like. These verbs may correspond to certain database operations. For example, the verbs "search," "find," and "look up" may correspond to a SQL SELECT operation while the verb "remove" may correspond to a SQL DELETE operation. Furthermore, the query semantic rules may require the verb to be followed by an object and one or more parameters. As such, the query builder 310 may be configured to parse the text of a speech-based query to identify a first portion of the text that corresponds to a verb, a second portion of the text that corresponds to an object, and a third portion of the text that corresponds to one or more parameters.

According to some example embodiments, the query builder 310 may determine, based on the query semantic rules, that the first portion of the text corresponds to a verb, when the first portion of the text matches one or more specific verbs specified by the query semantic rules. The query builder 310 may determine, based on the query semantic rules, that the second portion of the text corresponds to an object, when the second portion of the text follows a specific verb that indicates the operation, such as a search, that is to be performed at the database 135. Furthermore, the query builder 310 may determine, based on the query semantic rules, that the third portion of the text corresponds to one or more parameters, when that third portion of the text follows the second portion of the text specifying an object. To further illustrate, the query builder 310 may parse the sample query "Find sales orders from Customer A in Location B." Here, the query builder 310 may identify "find" as the verb. The query builder 310 may further identify the "sales order," which follows the verb "find," as being the object of the query. Moreover, the query builder 310 may identify the "Customer A in Location B," which follows the object "sales order," as being the parameters of the query.

In some example embodiments, the query validator 312 may be configured to validate a query (e.g., generated by the query builder 310) by at least determining whether the database 135 supports the query. For example, the query validator 312 may validate the query by at least determining whether the object specified by the query, for example "sales order," exists at the database 135. That is, the query validator 312 may verify whether the database 135 has a "sales order" data structure that stores a plurality of records corresponding to individual sales orders. Alternately and/or additionally, the query validator 312 may validate the query by at least determining whether the database 135 supports the parameters specified by the query. Here, the query validator 312 may determine whether the "sales order" object has attribute that corresponds to the parameters specified by the query, such as customer and location. If the query validator 312 is unable to validate a query, the query validator 312 may generate an exception. By contrast, if the query validator 312 is able to validate a query, the validated query may be executed at the database 135. It should be appreciated that a validated query may be mapped to a SQL statement prior to being executed at the database 135.

In some example embodiments, the database interface 314 may be configured to execute queries that have been validated by the query validator 312. For instance, the database interface 314 may include one or more application programming interfaces associated with the DBMS 130 and/or the database 135. Thus, the database interface 314 may execute a query that has been validated by the query validator 312 by at least calling the one or more application programming interfaces associated with the DBMS 130 and/or the database 135. Alternately and/or additionally, the database interface 314 may receive the result of the query via the one or more application programming interfaces.

In some example embodiments, the query result processor 316 may be configured to process at least some of the query results received from the DBMS 130 and/or the database 135. For instance, the query result processor 316 may process the query results in accordance with one or more predefined rules for presenting the query result to a user, such as via the audio output device 224. It should be appreciated that these predefined rules may be configured to structure the query results (e.g., into natural language) and/or remove complexity from the query results. The processed query results may be converted to an audio signal by the text-to-speech converter 220 to enable a speech-based delivery of the results of the query. For example, the results of the query may be played to a user by the audio output device 124 at the client terminal 120.

Figure 4A:
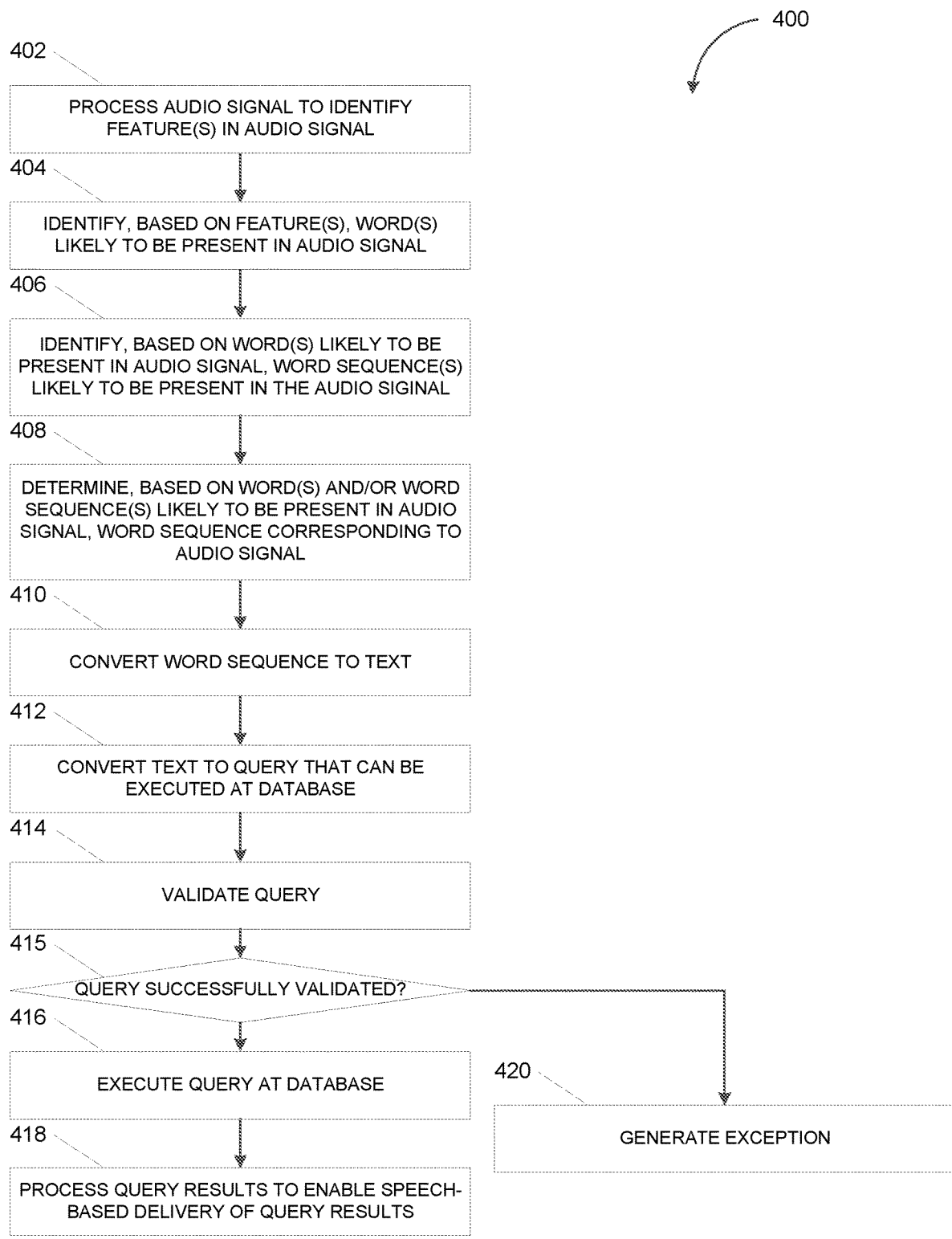
FIG. 4A depicts a flowchart illustrating a process for accessing a database, in accordance with some example embodiments.

FIG. 4A depicts a flowchart illustrating a process 400 for accessing a database, in accordance with some example embodiments. Referring to FIGS. 1-4A, the process 400 may be performed by the voice-to-query controller 110 for example, by the speech recognition engine 112 and the query engine 114.

At 402, the voice-to-query controller 110 may process an audio signal to at least identify one or more features present in the audio signal. For example, the voice-to-query controller 110, for example the audio signal processor 210, may process an audio signal captured by the audio input device 122 to at least extract, from the audio signal, one or more phonemes. Moreover, in some example embodiments, the voice-to-query controller 110 may process the audio signal to remove noise and channel distortions from the audio signal. Alternately and/or additionally, the voice-to-query controller 110 may process the audio signal by converting the audio signal from a time domain to a frequency domain.

At 404, the voice-to-query controller 110 may identify, based at least on the one or more features present in the audio signal, one or more words that are likely to be present in the audio signal. For example, the voice-to-query controller 110 (e.g., the acoustic model 212) may determine, based on a plurality of established statistical representations, words that may be formed by the phonemes present in the audio signal. The plurality of established statistical representations may be Hidden Markov Models, a recurrent neural network, and/or the like. The voice-to-query controller 110 may determine an audio model score for each word, which may indicate a respective probability or likelihood that the phonemes extracted from the audio signal form these words.

At 406, the voice-to-query controller 110 may identify, based at least on the one or more words that may be present in the audio signal, one or more word sequences that are likely to be present in the audio signal. For instance, the voice-to-query controller 110, for example the language model 214, may identify, based on the statistical distribution of a known set of word sequences, word sequences that are likely to be present in the audio signal. In particular, the voice-to-query controller 110 may determine one or more language model scores indicative of a probability or likelihood that a corresponding word sequence is present in the audio signal.

At 408, the voice-to-query controller 110 may determine, based at least on the words and/or word sequences that are likely to be present in the audio signal, a word sequence that corresponds to the audio signal. For example, the voice-to-query controller 110, for example the decoder 216, may determine, based at least on the acoustic model scores of the words that may be present in the audio signal and/or the language model scores of the word sequences that may be present in the audio signal, a word sequence that corresponds to the audio signal. Here, the voice-to-query controller 110 may determine the audio signal corresponds to a word sequence having the highest acoustic model score and/or language model score.

At 410, the voice-to-query controller 110 may convert the word sequence into text. For instance, the voice-to-query controller 110, for example the speech-to-text converter 218, may generate text corresponding to the word sequence.

At 412, the voice-to-query controller 110 may convert the text to a query that can be executed at the database 135. For example, the voice-to-query controller 110, for example the query builder 310, may generate a query based at least on the text corresponding to the audio signal. The query may be generated based at least on the query semantic rules, which may govern the diction and/or the syntax of a speech-based query. For example, the voice-to-query controller 110 may apply the query semantic rules to identify portions of the text of a speech-based query that corresponds to a verb, an object, and/or one or more parameters. The voice-to-query controller 110 may further form a query based at least on the portions of the text identified as the verb, the object, and/or the one or more parameters.

At 414, the voice-to-query controller 110 may validate the query. For example, the voice-to-query controller 110, for example the query validator 312, may validate the query by at least determining whether the object specified by the query exists at the database 135. Alternately and/or additionally, the voice-to-query controller 110 may validate the query by at least determining whether the database 135 supports the parameters specified by the query.

At 415-Y, the voice-to-query controller 110 may be able to successfully validate the query. As such, at 416, the voice-to-query controller 110 may execute the query at the database 135. For example, the voice-to-query controller 110, for example the query validator 312, may map a validated query to a corresponding SQL statement. Moreover, the voice-to-query controller 110, for example the database interface 314, may execute the query by making one or more calls to the application programming interfaces associated with the DBMS 130 and/or the database 135.

At 418, the voice-to-query controller 110 may process the results of the query to at least enable a speech-based delivery of the results of the query. For instance, the voice-to-query controller 110, for example the query result processor 316, may process the results of the query in accordance with one or more predefined rules for presenting the query results to a user. The query results may be presented, for example, via the audio output device 224. These predefined rules may be configured to structure the query results (e.g., into natural language) and/or remove complexity from the query results. Furthermore, the voice-to-query controller 110, for example the text-to-speech converter 220, may convert into an audio signal the text corresponding to the query results. In doing so, the query results may be delivered to the user as an audio signal that may be played via the audio output device 224.

Alternately and/or additionally, at 415-N, the voice-to-query controller 110 may be unable to successfully validate the query. For example, the voice-to-query controller 110, for example the query validator 312, may determine that the object specified by the query does not exist at the database 135. Alternately and/or additionally, the voice-to-query controller 110 may determine that the database 135 does not support the parameters specified by the query.

At 420, when the voice-to-query controller 110 is unable to successfully validate the query, the voice-to-query controller 110 may generate an exception. For instance, when the voice-to-query controller 110, for example the query validator 312, cannot validate a query, the voice-to-query controller 110 may generate an exception indicating that the query is invalid.

Figure 4B:
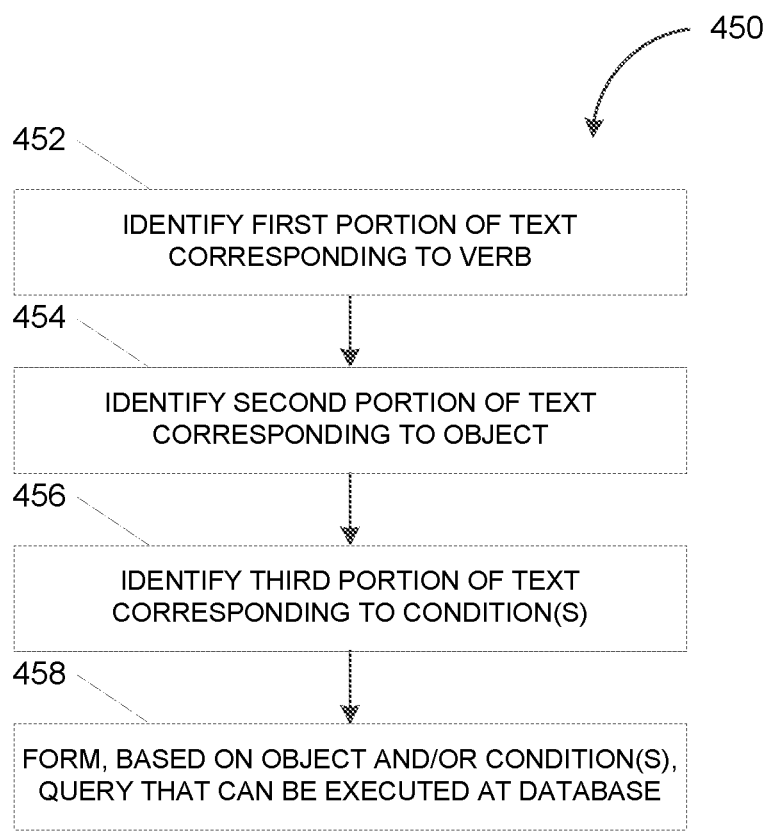
FIG. 4B depicts a flowchart illustrating a process for converting text into a query, in accordance with some example embodiments.

FIG. 4B depicts a flowchart illustrating a process 450 for converting text into a query, in accordance with some example embodiments. Referring to FIGS. 1-3 and 4A, the process 450 may be performed by the voice-to-query controller 110 for example, by the query engine 114. The process 450 may implement operation 412 of the process 400.

At 452, the voice-to-query controller 110 may identify a first portion of text that corresponds to a verb. A speech-based query may conform to one or more query semantic rules that govern the diction and/or syntax of the speech-based query. As such, the voice-to-query controller 110 may apply the query semantic rules to identify a portion of the text that corresponds to one or more specific verbs such as, for example, "search," "find," "look up," and/or the like. The verb may correspond to an operation that is to be performed at the database 135. In some example embodiments, the voice-to-query controller 110 may determine which portion of the speech-based query corresponds to a verb by at least matching the text of the speech-based query to one or more specific verbs such as, for example, "search," "find," "look up," and/or the like.

At 454, the voice-to-query controller 110 may identify a second portion of text that corresponds to an object. For example, the voice-to-query controller 110, for example the query builder 310, may identify, based at least on the query semantic rules, a portion of the text that corresponds to an object. In some implementations of the current subject matter, the voice-to-query controller 110 may determine that a portion of the text corresponds to an object, when that portion of the text follows a verb.

At 456, the voice-to-query controller 110 may identify a third portion of text that corresponds to one or more parameters. For example, the voice-to-query controller 110, for example the query builder 310, may identify, based at least one query semantic rule, a portion of the text that corresponds to one or more parameters. In some implementations of the current subject matter, the voice-to-query controller 110 may determine that a portion of the text corresponds to one or more parameters, when that portion of the text follows another portion of the text determined, at operation 454, to correspond to an object.

At 458, the voice-to-query controller 110 may form, based at least on the verb, the object, and/or the one or more parameters, a query that can be executed at the database 135. For instance, the voice-to-query controller 110, for example the query builder 310, may form a query that includes the object and/or the one or more parameters. To further illustrate, the voice-to-query controller 110 may generate a query that searches for sales order for a particular customer in a certain location. This query may be further mapped to a corresponding SQL statement that can be executed at the database 135.

Figure 5:
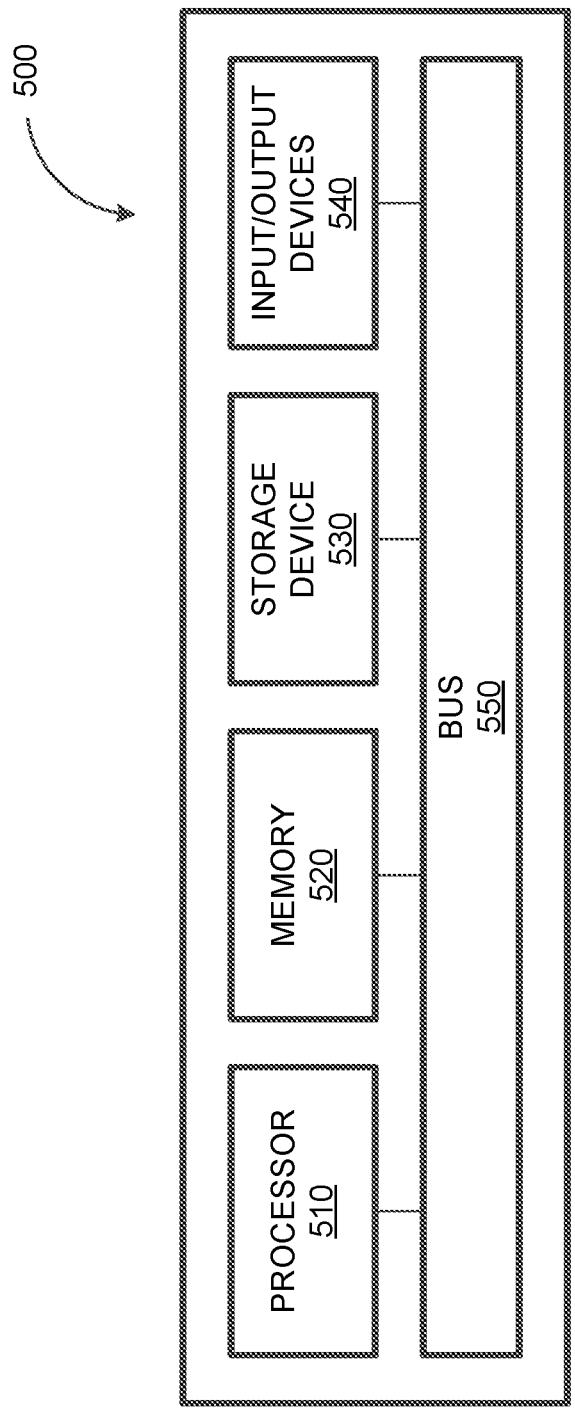
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the allocation engine 140 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the allocation engine 140. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

Although various examples in the present disclosure refer to SQL and relational databases, it should be appreciated that the present disclosure also applies to other query languages and database types.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer implemented method, comprising:
    converting, into text and by an automatic speech recognition engine, audio comprising a speech-based query, the syntax of the speech-based query being in accordance with an unstructured natural language syntax rather than in accordance with a structured syntax pattern associated with a structured query language, wherein the converting including:
        identifying one or more phonemes in the audio;
        determining, using one or more statistical representation models, one or more words formed by the identified one or more phonemes, each word having an acoustic model score corresponding to a likelihood of the word being present in the audio;
        forming, using the acoustic model score, one or more word sequences including the one or more words, and converting the one or more formed sequences into the text;
    identifying, based at least on a semantic rule, a first portion of the text, the first portion of the text comprising an operation specified by the speech-based query;
    identifying, based at least on the semantic rule, a second portion of the text, the second portion of the text comprising an object specified by the speech-based query;
    identifying, based at least on the semantic rule, a third portion of the text, the third portion of the text comprising a parameter specified by the speech-based query;
    generating a database query having a predetermined query structure and including the operation being performed with respect to the object and in accordance with the parameter, the database query being generated in accordance with at least one of a diction and a syntax of the text specified by the semantic rule;
    validating the database query by determining whether the database supports the predetermined query structure and includes a table corresponding to the object specified in the database query, wherein validating includes determining whether the database supports the parameter;
    in response to determining that the database supports the predetermined query structure and includes the table corresponding to the object specified in the database query, further validating the database query by at least determining whether the table includes a column corresponding to the parameter specified in the database query;
    in response to successfully validating the database query, executing, at the database, the database query including by mapping the database query to a structured query language statement and performing, in accordance with the parameter, the operation on the object by executing the structured query language statement, wherein in response to failing to successfully validate the database query, generating an exception and indicating that the database query is invalid; and
    receiving one or more results of the executing of the database query at the database and converting, in accordance with one or more predefined rules, the received one or more results into an audio output format for outputting via an audio output device, wherein the one or more predefined rules define a structure of the audio output format.

2. The computer-implemented method of claim 1, wherein the object comprises the table at the database.

3. The computer-implemented method of claim 2, wherein the parameter comprises an attribute of the object, and wherein the attribute is stored in the column in the table corresponding to the object.

4. The computer-implemented method of claim 1, wherein the first portion of the text is identified by at least matching the first portion of the text to one or more verbs specified by the semantic rule.

5. The computer-implemented method of claim 1, wherein the second portion of the text is identified by at least identifying a portion of the text that follows the first portion of the text.

6. The computer-implemented method of claim 1, wherein the third portion of the text is identified by at least identifying a portion of the text that follows the second portion of the text.

7. The computer-implemented method of claim 1, wherein the database query is successfully validated based at least on the database including the table corresponding to the object specified in the database query and the table including the column corresponding to the parameter specified in the database query.

8. A system, comprising:
at least one processor; and
at least one memory storing instructions which, when executed by the at least one processor, result in operations comprising:
converting, into text and by an automatic speech recognition engine, audio comprising a speech-based query, the syntax of the speech-based query being in accordance with an unstructured natural language syntax rather than in accordance with a structured syntax pattern associated with a structured query language, wherein the converting including
identifying one or more phonemes in the audio;
determining, using one or more statistical representation models, one or more words formed by the identified one or more phonemes, each word having an acoustic model score corresponding to a likelihood of the word being present in the audio;
forming, using the acoustic model score, one or more word sequences including the one or more words, and converting the one or more formed sequences into the text;
identifying, based at least on a semantic rule, a first portion of the text, the first portion of the text comprising an operation specified by the speech-based query;
identifying, based at least on the semantic rule, a second portion of the text, the second portion of the text comprising an object specified by the speech-based query;
identifying, based at least on the semantic rule, a third portion of the text, the third portion of the text comprising a parameter specified by the speech-based query;
generating a database query having a predetermined query structure and including the operation being performed with respect to the object and in accordance with the parameter, the database query being generated in accordance with at least one of a diction and a syntax of the text specified by the semantic rule;
validating the database query by determining whether the database supports the predetermined query structure and includes a table corresponding to the object specified in the database query, wherein validating includes determining whether the database supports the parameter;
in response to determining that the database supports the predetermined query structure and includes the table corresponding to the object specified in the database query, further validating the database query by at least determining whether the table includes a column corresponding to the parameter specified in the database query;
in response to successfully validating the database query, executing, at the database, the database query including by mapping the database query to a structured query language statement and performing, in accordance with the parameter, the operation on the object by executing the structured query language statement, wherein in response to failing to successfully validate the database query, generating an exception and indicating that the database query is invalid; and
receiving one or more results of the executing of the database query at the database and converting, in accordance with one or more predefined rules, the received one or more results into an audio output format for outputting via an audio output device, wherein the one or more predefined rules define a structure of the audio output format.

9. The system of claim 8, wherein the object comprises the table at the database.

10. The system of claim 9, wherein the parameter comprises an attribute of the object, and wherein the attribute is stored in the column in the table corresponding to the object.

11. The system of claim 8, wherein the first portion of the text is identified by at least matching the first portion of the text to one or more verbs specified by the semantic rule.

12. The system of claim 8, wherein the second portion of the text is identified by at least identifying a portion of the text that follows the first portion of the text.

13. The system of claim 8, wherein the third portion of the text is identified by at least identifying a portion of the text that follows the second portion of the text.

14. A non-transitory computer-readable storage medium including program code, which when executed by at least one data processor, cause operations comprising:
converting, into text and by an automatic speech recognition engine, audio comprising a speech-based query, the syntax of the speech-based query being in accordance with an unstructured natural language syntax rather than in accordance with a structured syntax pattern associated with a structured query language, wherein the converting including
identifying one or more phonemes in the audio;
determining, using one or more statistical representation models, one or more words formed by the identified one or more phonemes, each word having an acoustic model score corresponding to a likelihood of the word being present in the audio;
forming, using the acoustic model score, one or more word sequences including the one or more words, and converting the one or more formed sequences into the text;
identifying, based at least on a semantic rule, a first portion of the text, the first portion of the text comprising an operation specified by the speech-based query;
identifying, based at least on the semantic rule, a second portion of the text, the second portion of the text comprising an object specified by the speech-based query;
identifying, based at least on the semantic rule, a third portion of the text, the third portion of the text comprising a parameter specified by the speech-based query;
generating a database query having a predetermined query structure and including the operation being performed with respect to the object and in accordance with the parameter, the database query being generated in accordance with at least one of a diction and a syntax of the text specified by the semantic rule;
validating the database query by determining whether the database supports the predetermined query structure and includes a table corresponding to the object specified in the database query, wherein validating includes determining whether the database supports the parameter;
in response to determining that the database supports the predetermined query structure and includes the table corresponding to the object specified in the database query, further validating the database query by at least determining whether the table includes a column corresponding to the parameter specified in the database query;
in response to successfully validating the database query, executing, at the database, the database query including by mapping the database query to a structured query language statement and performing, in accordance with the parameter, the operation on the object by executing the structured query language statement, wherein in response to failing to successfully validate the database query, generating an exception and indicating that the database query is invalid; and
receiving one or more results of the executing of the database query at the database and converting, in accordance with one or more predefined rules, the received one or more results into an audio output format for outputting via an audio output device, wherein the one or more predefined rules define a structure of the audio output format.

\* \* \* \* \*